United States Patent [19]

Belloni Cofler et al.

[11] Patent Number: 4,629,709
[45] Date of Patent: Dec. 16, 1986

[54] NON-NOBLE METAL CATALYTIC MICROAGGREGATES, A METHOD FOR THEIR PREPARATION AND THEIR APPLICATION IN THE CATALYSIS OF THE PHOTOREDUCTION OF WATER

[75] Inventors: Jacqueline Belloni Cofler, Palaiseau; Jean-Louis Marignier, Meudon; Marie-Odile Delcourt Euverte, Magny-Les-Hameaux; Michèle Minana Lourseau, Rambouillet, all of France

[73] Assignee: Centre National de La Recherche Scientifique, France

[21] Appl. No.: 744,445

[22] Filed: Jun. 13, 1985

[30] Foreign Application Priority Data

Jun. 13, 1984 [FR] France ................................ 84 09196

[51] Int. Cl.$^4$ ............................................. B01J 37/34
[52] U.S. Cl. ........................................ 502/5; 502/522; 204/157.44
[58] Field of Search ................. 502/5, 522; 204/157.44

[56] References Cited

U.S. PATENT DOCUMENTS

| | | | |
|---|---|---|---|
| 1,092,206 | 4/1914 | Ellis | 502/5 |
| 2,208,616 | 7/1940 | Wellman et al. | 502/5 |
| 2,604,442 | 7/1952 | Lambert et al. | 204/157.44 |
| 3,048,529 | 8/1962 | Mohlman | 502/5 X |
| 3,074,880 | 1/1963 | Domash et al. | 204/157.44 |
| 3,189,562 | 6/1965 | Graham | 502/5 |
| 3,803,010 | 4/1974 | Searman et al. | 204/157.44 |

FOREIGN PATENT DOCUMENTS

| | | | |
|---|---|---|---|
| 229305 | 7/1960 | Australia | 204/157.44 |
| 703138 | 2/1965 | Canada | 204/157.44 |
| 836702 | 6/1960 | United Kingdom | 502/5 |

Primary Examiner—Carl F. Dees
Attorney, Agent, or Firm—Sughrue, Mion, Zinn, Macpeak, and Seas

[57] ABSTRACT

The invention relates to metal microaggregates.

The monodisperse of the invention are non-noble metal microaggregates in a monodispersed form in a solid or liquid medium and of a size uniformly less than 5 nm. They are obtained by irradiation of a metal salt or a mixture of salts, by means of an ionizing radiation source, by dissolving a non-noble metal salt or a mixture of metal salts, at least one of which is a non-noble metal, in an appropriate solvent, in the presence of an oxidizing radical scavenger and a surfactant and/or a support, and then by carrying out irradiation.

Application is for catalysis of various reactions, in particular the photoreduction of water into hydrogen.

17 Claims, No Drawings

NON-NOBLE METAL CATALYTIC MICROAGGREGATES, A METHOD FOR THEIR PREPARATION AND THEIR APPLICATION IN THE CATALYSIS OF THE PHOTOREDUCTION OF WATER

The present invention relates to new metal microaggregates, and more particularly to new monodisperse phases of non-noble metal aggregates, a method for their preparation by the radiolytic reduction of metal salts, and to their application as reaction catalysts.

Various physical, chemical or physico-chemical methods are known for preparing dispersed metal phases. For example, the metal can be ground mechanically and then dispersed in the selected medium, or a metal which has been previously vaporized under a vacuum can be condensed onto a support. Also, such can be carried out by ion reduction with molecular hydrogen at a high temperature, or by attack with a base on a metal alloy, for example for the preparation of Raney nickel. The physico-chemical methods can consist of reducing metal ions at the surface of an electrode, of carrying out a discharge in a metal ion solution or carrying out a photochemical reduction.

However, these known methods do not yield the metal in the state of microaggregates having a size of less than a few nanometers uniformly dispersed in both a liquid or solid medium.

For example, German Pat. No. 1,154,442 describes the photochemical decomposition of an organic metal compound in a solution of an ethylene polymer in a hydrocarbon or an ether in order to obtain a colloidal dispersion of lead, zinc, nickel or iron. As described in U.S. Pat. No. 4,264,421, a photochemical method also gives a metal deposit on a support. U.S. Pat. No. 1,805,199 describes the thermal decomposition of a metal derivative yielding colloidal lead or nickel particles which, in solution, have the Tyndall effect characteristic of a particle size greater than 100 nm. German Pat. No. 1,717,152 describes the preparation of a nickel-based catalyst by high temperature vaporization of the metal in order to obtain particles of a size of between 30 and 45 nm.

The use of ionizing radiation has also been suggested ($\gamma$ or $\chi$ photons or accelerated electrons) in order to carry out in situ reduction of noble metal salts using solvated electrons formed in the solvent. This method has the advantage of producing solvated electrons at all points of the liquid, even inside the micropores of an alveolar support which is appropriately used. However, the metals thus prepared belong to the group of noble metals (Ir, Pt, Pd, Rh, Ru, Au, Ag, Cd, Tl), whilst the method does not enable other metals, such as nickel, which are also often used in various catalysts for numerous reactions, to be obtained in a stable and very divided form.

These difficulties result from the fact that the non-precious metals are characterized by a redox potential which is more favorable to corrosion and which is further moved towards unfavorable values for quasi-atomic aggregates. The production of metals in a state of extreme division can only succeed by avoiding, at least partially, the inverse reaction of corrosion during the nucleation phase of the aggregate. Beyond a certain size, the particles are stabilized with respect to the ambient medium.

Another difficulty appears in the case of multivalent ions for which progressive radiolytic reduction brings partially reduced states into play. If this reduction method has the advantage of ensuring the dispersion of the incipient metal atoms and of enabling control of their aggregation, it has, like any method based on the reduction of ions, risks of oxidation on the return of the intermediate state or states, which risks are added to those of the corrosion of the aggregates at the very first stage of their growth.

The object of the present invention is to prepare monodisperse phases of non-noble metal microaggregates possessing specific physico-chemical characteristics, and which are used in particular as reaction catalysts.

The object of the invention is therefore monodisperse phases of non-noble metal microaggregates, such as nickel, cobalt, copper, mercury or lead, or alloys of such metals with noble or non-noble metals, of a size less than 5 nm, obtained without chemical reducing agents, by in situ reduction of metal salts by means of ionizing radiation.

A further object of the invention is the application of the non-noble metal microaggregates as reaction catalysts and in particular for the photoreduction of water into hydrogen.

The invention further relates to a method enabling the easy preparation by radiolytic means of new non-noble metal microaggregates in the form of uniform monodisperse phases in a liquid or even solid medium.

The method in accordance with the invention consists of irradiating a metal salt, or a mixture of salts, by means of an ionizing radiation source, and is distinguished in that a non-noble metal salt or a mixture of metal salts at least one of which is a non-noble metal is dissolved in a suitable solvent, in the presence of an oxidizing radical scavenger, and a tensioactive agent and/or a support, and then irradiation is carried out.

The oxidizing radical scavenger used in the method in accordance with the invention is preferably a primary or secondary alcohol such as isopropanol, or a formate such as an alkaline metal formate. It may be preferable to select the formate of the metal which it is desired to reduce, for example nickel formate. This compound is used to scavenge the oxidizing radicals formed in the solution. In effect, in addition to the solvated electrons, radiolysis of the solutions produces radicals, such as the OH' radical in the case of water, which can in return oxidize part of the atoms resulting from reduction with the solvated electrons. The addition of a primary or secondary alcohol (RHOH) which reacts rapidly with the OH' radicals to give new reducing R'OH radicals, enables the metal yield to be increased. The $HCOO^-$ formate ion can also be used as a radical scavenger. In this case the reaction product is the $COO^-$ radical which also possesses excellent reducing properties.

The concentration of the radical scavenger is determined dependent upon the quantity of the metal to be produced, and therefore upon the necessary dosage. The concentration of the radical scavenger can, for example, be between $10^{-2}$ and 1 mol.$1^{-1}$.

The metal yield, for a given dosage of ionizing radiation, is higher for the concentrations of metal salts. However, if the concentration is too high, the greater ionic strength of the medium accentuates the aggregations of colloids and the particles obtained are then of a larger size.

The solvent used is selected dependent upon the metal salt and can, for example, be water, acetonitrile, ammonia, tetrahydrofuran, ethylenediamine or an alcohol. As necessary, a common wetting agent can also be used.

As indicated above, the method is carried out in the presence of a surfactant agent and/or of a support, that is, in a liquid or solid medium. The surfactant used is preferably polyvinyl alcohol at a concentration (monomeric) equal to several times, for example 10 times, that of the metal atoms. Instead of the surfactant, a suitable support, such as silicas, resins, oxides ($Al_2O_3$, $RuO_2$, $TiO_2$), zeolites, carbon or insoluble salts, such as strontium titanate or cadmium sulfide, is used and the metal microaggregates are then deposited on this support.

In accordance with one means of using the method of the invention, a basic medium can be used and the pH can, for example, be brought to 9 or more, and preferably between 10 and 11, by the addition of sodium carbonate or ammonia. However, the pH must not be too high in order to avoid precipitation of the metal hydroxide from hydrolysis by the solvent.

On the other hand, too low a pH (acidic or weakly basic) is disadvantageous to the stability of the metal microaggregates. In effect, any corrosion or reoxidation of the incipient metal from the action of the oxidizing agents present in the medium must be avoided. The solvated $H^+$ proton can have an oxidizing action and it is known that the formation of a divided metal phase from the corresponding salt causes progressive acidification of the medium. Also, the metal aggregates do not form if the medium is initially acidic or weakly basic, unless the concentration of the metal is considerably increased, which can be a disadvantage for the control of nucleation.

By working in basic pH conditions in the presence of a surfactant such as polyvinyl alcohol and an oxidizing radical scavenger such as isopropanol, the production of microaggregates of metals such as rhodium and lead can be improved considerably.

It can be preferable, in accordance with the invention, to facilitate the nucleation of metal atoms such as Ni, Co, Fe, Cu or Hg by producing them in the presence of microaggregates of noble metal such as palladium or platinum, the preparation of which is, moreover, well known. These metals, for example platinum or palladium, can be added in small quantities, for example from 0.1 to 2% in atoms of the metal to be reduced. Greater quantities, above 2%, can be used with the object of producing alloys containing platinum or palladium. They can be prepared by first adding a suspension of previously reduced palladium or platinum, or by carrying out the radiolytic reduction of a mixture of salts. In this manner and depending upon the quantity of noble metal added, suspensions of nickel are obtained containing a few % of Pt or Pd which are located at the heart of the aggregate or are distributed as in an alloy.

In this manner, Ni, Co, Pb, Hg, Cu, Cd alloys, with all proportions of Pd or Pt, and FeCu alloys can be prepared. Analysis of the diffraction diagrams shows that these atoms are evenly arranged in the sites of the system, as in a solid solution when the metals are miscible. This regularity in the arrangement of the atoms in presence of oxygen. In effect, the addition of a base to the solution, associated with the presence of oxygen at reduced pressure, enables the incipient atoms to be protected from oxidation in return, by preventing, through complexing with the oxygen, the inverse reaction of the intermediate valence with the medium. In the case of a low concentration solution of a metal salt (a few $10^{-3}$ mol.$1^{-1}$) the metal is not formed under irradiation in a basic medium and in the presence of an inert gas or under a vacuum. Nor in the presence of air does the reduction take place due to the reaction of the reducing agents and the solvated electrons with the oxygen. To the contrary, the addition of oxygen at a pressure of approximately 50 torrs enables the metal colloid to form. This addition of oxygen must be removed after irradiation so as to not harm the stability of the colloid.

Finally a transparent brown solution which is characteristic of subcolloidal solution is obtained. For certain metals (Cu, Ni, Pb, Co, and alloys above a certain proportion of these metals), the color disappears on contact with air, which signifies the reoxidation of the metal. The solutions must therefore be kept under a vacuum or under an inert atmosphere (nitrogen, argon).

In accordance with another embodiment of the method of the invention, it may be preferable to greatly increase the concentration of the surfactant. In this case radiolytic reduction can, as necessary, be carried out at a relatively low pH, for example close to 7, without it being necessary to add a base to the solution. For example, for a solution containing polyvinyl alcohol at a concentration of 0.2 mol.$1^{-1}$ as the tensioactive agent, and the concentration of $Ni^{2+}$ being $2 \times 10^{-3}$ mol.$1^{-1}$, the reduction of the metal is carried out under a vacuum in an initially neutral medium.

The metal salt concentration can be between $10^{-4}$ and $10^{-1}$ mol.$1^{-1}$, and preferably between $10^{-3}$ and $10^{-2}$ mol.$1^{-1}$ approximately. It can be preferable, in particular in the case of nickel, to use a salt of a concentration of between $10^{-2}$ and $10^{-1}$ mol.$1^{-1}$ in order to facilitate the aggregation of the metal. The microaggregates of nickel can then be formed in the presence of a radical scavenger and a surfactant or a porous support with the addition of a base, oxygen, platinum or palladium. For example, the solution can contain nickel salt ($5 \times 10^{-2}$ mol.$1^{-1}$), polyvinyl alcohol (a few $10^{-1}$ mol.$1^{-1}$ as a monomer) and isopropanol at a concentration in relation with the desired quantity of nickel (for example $10^{-2}$ to $10^{-1}$ mol.$1^{-1}$). The irradiation forms nickel atoms at a rate of one atom for approximately 200 eV of energy absorbed (50 eV in the case of the formate).

The metal salt can be selected from among the conventional salts of the metals which are sought to be reduced. For example, a metal sulfate, chloride, perchlorate or formate may be used. Formate has the advantage of providing an anion which plays the role or radical scavenger.

Irradiation is carried out using any conventional source of ionizing radiation, at doses which are dependent on the quantity of metal and which can for example be on the order of 50 to 700 eV per atom of metal. For example, a (cobalt 60) $\gamma$ radiation source of from 0.2 to 0.5M.rad/h can be used for 1 to 20 hours. The with a cometal, characterized by the size of the microaggregates, which is less than 5 nm and preferably less than approximately 3 nm, and by their uniform dispersion in the solution or on the support, even inside the micropores of an alveolar support.

In addition, non-noble metal microaggregates or alloys in a stable form may be obtained which can be used for various applications.

The non-noble metal can be selected from among nickel, cobalt, lead, mercury, iron, copper and rhodium. The jointly used cometal can be selected from among the same metals or the noble metals, preferably platinum and palladium.

The microaggregates obtained can be used as reduction catalysts for all the reactions normally catalyzed by Raney nickel. They can be used either alone or deposited on a support, in particular for the photoreduction of water into hydrogen.

It is known that the efficacy of a heterogeneous catalyst depends essentially on the speed of the reversible interreactions with the molecules at the interface between phases, and consequently on the degree of dispersion of the catalyst. It is therefore particularly useful to be able to use catalysts, in particular metal catalysts, which are finely divided (in particular in the microaggregate state) and in a stable and homogeneous form.

With regard to the photosensitive dissociation of water with the object of converting and stocking solar energy, it is known that the use of a catalyst is indispensable in order to carry out the concerted transfer of several electrons. It can be noted that the activity of the nickel microaggregates in accordance with the present invention is comparable to that of the best known catalysts in this reaction. Thus, for a same concentration, the nickel microaggregates have activity equal to approximately 80% of that of platinum, whereas the activity of Raney nickel is practically none. The microaggregates in accordance with the invention are therefore particularly advantageous from the economic standpoint.

The examples given below illustrate the invention in greater detail without limiting the scope thereof.

In the case of preparation of a catalyst for dry use, the support is impregnated to the extent of the volume of its pores with the solution of metal ions. In the case of a catalyst for wet use, either the divided support or the surfactant (polyvinyl alcohol) is added to the ion solution.

EXAMPLE 1

A subcolloidal solution of nickel was prepared as indicated below at a concentration of $2 \times 10^{-3}$ mol.$l^{-1}$.

A commercial solution of nickel sulfate at the selected titer ($2 \times 10^{-3}$ mol.$l^{-1}$ which is 0.12 g.$l^{-1}$) was diluted. Polyvinyl alcohol was added at a rate of more than 10 times of monomer than metal atoms ($4.5 \times 10^{-2}$ mol.$l^{-1}$ which is 2 g.$l^{-1}$).

Isopropyl alcohol at a concentration of 0.28 mol.$l^{-1}$ and then palladium chloride (concentration $2 \times 10^{-4}$ mol.$l^{-1}$) were added to this solution. A few drops of sodium hydroxide 0.5M were then added to bring the pH to approximately 10.6, the solution was then degassed by pumping and irradiated with a (cobalt 60) $\gamma$ radiation source at a rate of 700 eV per atom of metal (which is $3.3 \times 10^{20}$ eV.$g^{-1}$). The irradiation was carried out for approximately 15 hours.

In this manner a transparent brown solution was obtained which had the characteristic of subcolloidal solution, which remained stable and did not form a sediment, even after storage for several months under an inert atmosphere. Electronic microscopic examination showed that the size of the microaggregates was less than 3 nm. The solvent was able to be removed by evaporation for the preparation of a catalyst for dry use.

EXAMPLES 2-16

By proceeding as in Example 1, in the presence or absence of palladium chloride, or by replacing it with copper sulfate (Ex. 8 and 9) and as appropriate without the addition of sodium hydroxide, metal microaggregates were prepared under the conditions indicated in the following table.

| Example No. | Metal Salt Conc. | Mol·$l^{-1}$ | pH | Cometal Conc. | Mol·$l^{-1}$ | Alcohol Mol·$l^{-1}$ | Formate Mol·$l^{-1}$ | P.V.A. Mol·$l^{-1}$ | Dose 1-20 eV·$g^{-1}$ |
|---|---|---|---|---|---|---|---|---|---|
| 1 | NiSO$_4$ | $2 \times 10^{-3}$ | 10.6 | PdCl$_2$ | $2 \times 10^{-4}$ | 0.28 | | $4.5 \times 10^{-2}$ | 3.3 |
| 2 | RhCl$_3$ | $10^{-3}$ | 0.9 | | | 0.56 | | $10^{-2}$ | 0.72 |
| 3 | NiSO$_4$ | $3 \times 10^{-3}$ | 10.2 | PdCl$_2$ | $10^{-5}$ | 0.8 | | 0.14 | 3.3 |
| 4 | NiSO$_4$ | $2 \times 10^{-3}$ | 8 | | | 0.56 | | * | 3.3 |
| 5 | CoSO$_4$ | $10^{-3}$ | 9.2 | PdCl$_2$ | $5 \times 10^{-5}$ | 0.56 | | $9 \times 10^{-2}$ | 1.32 |
| 6 | HgCl$_2$ | $10^{-3}$ | 11 | PdCl$_2$ | $10^{-4}$ | 0.56 | | $9 \times 10^{-2}$ | 0.35 |
| 7 | CuSO$_4$ | $10^{-3}$ | 10.2 | PdCl$_2$ | $10^{-4}$ | 0.56 | | 0.1 | 0.33 |
| 8 | FeSO$_4$ | $2 \times 10^{-3}$ | 10.4 | CuSO$_4$ | $2 \times 10^{-3}$ | 0.11 | | 0.2 | 3.3 |
| 9 | NiSO$_4$ | $5 \times 10^{-4}$ | 6.7 | CuSO$_4$ | $5 \times 10^{-4}$ | 0.056 | | 0.2 | 1.1 |
| 10 | CuSO$_4$ | $2 \times 10^{-3}$ | 10.4 | | | 0.56 | | 0.2 | 3.3 |
| 11 | PbClO$_4$ | $2 \times 10^{-3}$ | 8 | | | 0.11 | | $2 \times 10^{-2}$ | 0.4 |
| 12 | NiSO$_4$ | $2 \times 10^{-3}$ | 8.8 | ** | | 0.56 | | $9 \times 10^{-2}$ | 3.3 |
| 13 | NiSO$_4$ | $2 \times 10^{-3}$ | 6.7 | | | 0.28 | | 0.2 | 3 |
| 14 | NiSO$_4$ | $5 \times 10^{-2}$ | 6.7 | | | 0.028 | | 0.2 | 1.1 |
| 15 | NiSO$_4$ | $5 \times 10^{-2}$ | 6.7 | | | | 0.1 | 0.55 | 3.3 |
| 16 | NiSO$_4$ | $1.5 \times 10^{-2}$ | 6.7 | | | 0.56 | | * | 1.76 |

*SiO$_2$ (spherosil)
**Pressure O$_2$; 50 torrs

What is claimed is:

1. A non-noble metal microaggregate composition comprising a monodisperse phase of non-noble metal microaggregates in a liquid or solid medium, said microaggregates having a size which is uniformly less than 5 nm.

2. The non-noble metal microaggregate composition of claim 1, wherein the size of the microaggregates is less than 3 nm.

3. The non-noble metal microaggregate composition of any one of claims 1 or 2, wherein the non-noble metal is associated with a cometal.

4. The non-noble metal microaggregate composition of claim 3, wherein the cometal is selected from among palladium, platinum and copper.

5. The non-noble metal microaggregate composition of claim 1, wherein the non-noble metal is selected from the group consisting of nickel, cobalt, lead, mercury, iron, copper and rhodium.

6. The non-noble metal microaggregate composition of claim 1, characterized in that the microaggregates are in the form of a subcolloidal solution.

7. The non-noble metal microaggregate compositions of claim 1, characterized in that the microaggregates are in the form of a deposit on a support selected from the group consisting of silicas, resins, oxides, zeolites, carbon and insoluble salts such as strontium titanate or cadmium sulfide.

8. A method for the preparation of a non-noble metal microaggregate composition in homogeneous dispersed phases by irradiation of a metal salt, or a mixture of salts, by means of an ionizing radiation source, comprising dissolving a non-noble metal salt or a mixture of metal salts, wherein at least one is a non-noble metal, in a suitable solvent, in the presence of an oxidizing radical scavenger, and a surfactant and/or a support, and then carrying out irradiation.

9. The method of claim 8, wherein the oxidizing radical scavenger is a primary or secondary alcohol such as isopropanol, or a formate such as an alkaline metal formate.

10. The method of claim 9, wherein the radical scavenger is nickel formate.

11. The method of any one of claims 8 to 10, wherein the surfactant is polyvinyl alcohol in a concentration (monomeric) equal to several times that of the metal atoms.

12. The method of any one of claims 8 to 10, wherein the support is selected from among silicas, resins, oxides, carbon, zeolites and insoluble salts such as strontium titanate or cadmium sulfide.

13. The method of claim 8, wherein the pH is between 10 and 11.

14. The method of claim 8, wherein the irradiation is carried out in the presence of oxygen at reduced pressure.

15. The method of any one of claims 8 to 10, wherein the concentration of the metal salt is between $10^{-4}$ and $10^{-1}$ mol.l$^{-1}$.

16. The method of any one of claims 8 to 10, wherein palladium or platinum in the form of previously divided metal or in salt form is added at a rate of 0.1 to 2% in atoms of the metal to be reduced.

17. A catalyst for the photoreduction of water into hydrogen characterized in that it is composed of the metal microaggregate composition of any one of claims 1 or 2.

* * * * *